(12) United States Patent
Mavani (10) Patent No.: US 11,297,197 B2
(45) Date of Patent: Apr. 5, 2022

(54) SYSTEM FOR DIGITIZING AND PROCESSING RESOURCE DOCUMENTS

(71) Applicant: BANK OF AMERICA CORPORATION, Charlotte, NC (US)

(72) Inventor: Saurabh Mavani, Lake Hopatcong, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 337 days.

(21) Appl. No.: 16/738,507

(22) Filed: Jan. 9, 2020

(65) Prior Publication Data
US 2021/0218858 A1    Jul. 15, 2021

(51) Int. Cl.
| | |
|---|---|
| *H04N 1/00* | (2006.01) |
| *G06Q 20/04* | (2012.01) |
| *G06V 30/412* | (2022.01) |
| *G06V 30/413* | (2022.01) |
| *G06V 30/416* | (2022.01) |

(52) U.S. Cl.
CPC ..... *H04N 1/00843* (2013.01); *G06Q 20/0425* (2013.01); *G06V 30/412* (2022.01); *G06V 30/413* (2022.01); *G06V 30/416* (2022.01); *H04N 2201/3235* (2013.01); *H04N 2201/3236* (2013.01)

(58) Field of Classification Search
None
See application file for complete search history.

(56) References Cited

U.S. PATENT DOCUMENTS

| | | | | |
|---|---|---|---|---|
| 7,970,677 | B1* | 6/2011 | Oakes, III | G06Q 40/025 235/382 |
| 2016/0379185 | A1* | 12/2016 | Smith | G06Q 20/042 705/45 |

* cited by examiner

*Primary Examiner* — Lennin R Rodriguezgonzalez
(74) *Attorney, Agent, or Firm* — Moore & Van Allen PLLC; Nicholas C. Russell (57) ABSTRACT

Embodiments of the invention include systems, methods, and computer-program products for digitizing and processing transmission of a physical resource document from an issuer to a user and from a user to a processing institution for real-time posting of physical resource documents. In this way, the invention processes a physical resource document into an image format at the issuer and transmits a secure digital image file to the user. The image format is processed and digitized for resource processing. Upon user receipt, the system validates the resource distribution. Upon validation the system allows for processing the resource document and the resource distribution from that document as a digital real-time payment.

20 Claims, 6 Drawing Sheets

SYSTEM FOR DIGITIZING AND PROCESSING RESOURCE DOCUMENTS

BACKGROUND

Users utilize paper resource distribution documents for the transmission of resources from one party to another. However, paper resource distribution documents require a physical exchange of the document from issuer to recipient and a physical exchange from recipient to processing institution. As such, a need exists for digitizing and processing of the physical resource documents.

BRIEF SUMMARY

Embodiments of the present invention address the above needs and/or achieve other advantages by providing apparatuses (e.g., a system, computer program product, and/or other devices) and methods for digitization and processing of physical resource documents.

In some embodiments, the system may digitize and process the transmission of a physical resource document from an issuer to a user and from a user to a processing institution for real-time posting of physical resource documents. In this way, the invention processes a physical resource document into an image format at the issuer and transmits a secure digital image file to the user. The image format is processed and digitized for resource processing. Upon user receipt, the system validates the resource distribution. Upon validation the system allows for processing the resource document and the resource distribution from that document as a digital real-time payment.

In some embodiments, the issuer may draft a resource distribution document. Typically, this document may be written and physically handed to a recipient from an issuer. The recipient may then authorize the document and provide the document to a financial institution for processing into the recipient's designated account. This invention allows the issuer to digitize the resource distribution document and transmit it electronically to the recipient. The issuer and recipient may validate the resource distribution document and confirm its authentication. The system may then allow for the processing of the digital resource distribution document via payment rails outside of typical physical resource document processing. As such, the system may provide for a real-time processing and posting of the resource distribution.

In some embodiments, the invention provides an issuer with a way of digitizing a physical resource document, such as a check. This process allows the check to be processed via a person-to-person or real-time payment processing payment rail, avoiding the check processing network and expediting the processing speed.

Embodiments of the invention relate to systems, methods, and computer program products for digitization and real-time processing of a physical resource document, the invention comprising: integrating into an image capture device and extract a digital resource distribution document from an image capture of the physical resource distribution document, wherein the physical resource distribution document is drafted by an issuer to distribute resources to a recipient; identifying and dividing segments of the digital resource distribution document, wherein the segments are divided by attributes on the physical resource distribution document; transmitting, via a secure electronic communication channel, the digital resource distribution document to the recipient; reconstructing the digital resource distribution document and display the reconstructed digital resource distribution document on an interface associated with a recipient device, wherein the reconstructed digital resource distribution document displayed illustrates the physical resource distribution document drafted by the issuer; performing validation requests from the issuer, the recipient, and an entity; integrating the digital resource distribution document into the recipient resource application; and processing and posting, in real-time, resources from the physical resource distribution document to an account associate the recipient via the recipient resource application.

In some embodiments, processing and posting, in real-time, resources from the physical resource distribution document to an account associate the recipient via the recipient resource application further comprises validation from the issuer, the recipient, and the entity. In some embodiments, processing and posting is performed via real-time payment or person-to-person payment channels and not check processing channels.

In some embodiments, the validation request performed by the issuer confirms from the issuer an appropriate amount of resource distribution, authentication of the physical resource distribution document, and an appropriate recipient. In some embodiments, the validation request performed by the recipient confirms from the recipient an appropriate amount of resource distribution, authentication of receipt of the resource distribution document, and an appropriate issuer. In some embodiments, the validation request performed by the entity comprises performing a comparison analysis via machine learning application processing, wherein the comparison analysis compares a symmetry of attributes associated with the digital resource distribution document to a resource distribution instrument standard and flagging of digital resource distribution documents comprising a symmetrical anomaly.

In some embodiments, transmitting, via a secure electronic communication channel, the digital resource distribution document to the recipient is further performed via digital transmission to an address associated with the recipient, wherein the address is a digital identifier of the recipient.

In some embodiments, the resource distribution document comprises a check for a transfer of resources from the issuer to the recipient.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. As used herein, a "resource distribution document," "resource distribution instrument," "financial document," "financial record," or "payment instrument" may also refer to a myriad of resource distribution instrument documents, including but not limited to a check. Furthermore, the resource distribution document could include a deposit slip, a payment coupon, a receipt, general ledger tickets, or the like. In some embodiments, "document", "financial record", or "resource distribution instrument" may exist as a physical item printed on paper or other medium. Furthermore, "resource distribution document" may also refer to records associated with government data, legal data, identification data, and the like. The data of the financial records or non-financial records may be provided in a wide variety formats including, paper records, electronic or digital records, video records, audio records, and/or combinations thereof. Furthermore, the term "image lift data" or "data lift" may refer to the process of lifting one or more areas/elements of a document and storing those areas as metadata without storing the entire document as an image file.

In some embodiments, the system may receive images of resource distribution documents from one or more sources associated with the issuer. The resource distribution documents may be received from the issuer via the issuer device, from an entity, from other financial institutions, or the like.

In some embodiments, the system may digitize and process the transmission of a physical resource document from an issuer to a user and from a user to a processing institution for real-time posting of physical resource documents. In this way, the invention processes a physical resource document into an image format at the issuer and transmits a secure digital image file to the user. The image format is processed and digitized for resource processing. Upon user receipt, the system validates the resource distribution. Upon validation the system allows for processing the resource document and the resource distribution from that document as a digital real-time payment.

In some embodiments, the issuer may draft a resource distribution document. Typically, this document may be written and physically handed to a recipient from an issuer. The recipient may then authorize the document and provide the document to a financial institution for processing into the recipient's designated account. This invention allows the issuer to digitize the resource distribution document and transmit it electronically to the recipient. The issuer and recipient may validate the resource distribution document and confirm its authentication. The system may then allow for the processing of the digital resource distribution document via payment rails outside of typical physical resource document processing. As such, the system may provide for a real-time processing and posting of the resource distribution.

In some embodiments, the invention provides an issuer with a way of digitizing a physical resource document, such as a check. This process allows the check to be processed via a person-to-person or real-time payment processing payment rail, avoiding the check processing network and expediting the processing speed.

Figure 1:
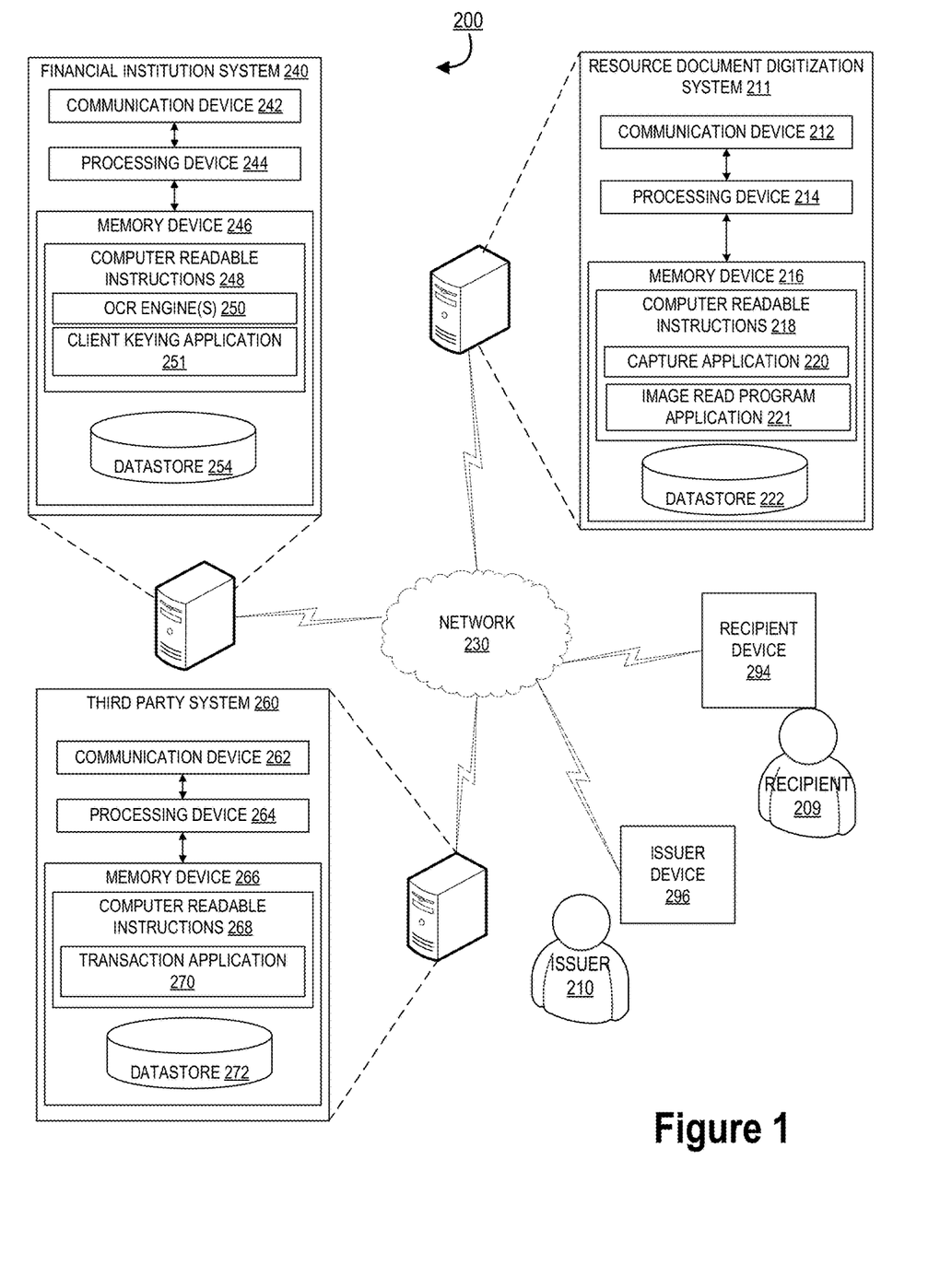
FIG. 1 provides a resource document digitization and processing system environment, in accordance with one embodiment of the present invention.

FIG. 1 illustrates a resource document digitization and processing system environment 200, in accordance with some embodiments of the invention. The environment 200 includes a resource document digitization system 211, a third party system 260, and a financial institution system 240. The environment 200 further includes a recipient systems 294 (e.g., mobile devices, laptop computers, tablets, and the like), and one or more issuer devices 296 associated with a user issuing a resource distribution document.

The systems and devices communicate with one another over the network 230 and perform one or more of the various steps and/or methods according to embodiments of the disclosure discussed herein. The network 230 may include a local area network (LAN), a wide area network (WAN), and/or a global area network (GAN). The network 230 may provide for wireline, wireless, or a combination of wireline and wireless communication between devices in the network. In one embodiment, the network 230 includes the Internet.

The resource document digitization system 211, the third party system 260, and the financial institution system 240 each includes a computer system, server, multiple computer systems and/or servers or the like. The financial institution system 240, in the embodiments shown has a communication device 242 communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a one or more OCR engine applications 250 and a client keying application 251. The memory device 246 also includes a datastore 254 or database for storing pieces of data that can be accessed by the processing device 244. In some embodiments, the datastore 254 includes a resource distribution document data repository.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The resource document digitization system 211 includes a communication device 212 communicably coupled with a processing device 214, which is also communicably coupled with a memory device 216. The processing device 214 is configured to control the communication device 212 such that the resource document digitization system 211 communicates across the network 230 with one or more other systems. The processing device 214 is also configured to access the memory device 216 in order to read the computer readable instructions 218, which in some embodiments includes a capture application 220 and an image read program application 221. The memory device 216 also includes a datastore 222 or database for storing pieces of data that can be accessed by the processing device 214.

The third party system 260 includes a communication device 262 communicably coupled with a processing device 264, which is also communicably coupled with a memory device 266. The processing device 264 is configured to control the communication device 262 such that the third party system 260 communicates across the network 230 with one or more other systems. The processing device 264 is also configured to access the memory device 266 in order to read the computer readable instructions 268, which in some embodiments includes a transaction application 270. The memory device 266 also includes a datastore 272 or database for storing pieces of data that can be accessed by the processing device 264.

In some embodiments, the capture application 220, the image read program application 221, and the transaction application 270 interact with the OCR engines 250 to receive or provide financial record images and data, detect and extract financial record data from financial record images, analyze financial record data, and implement business strategies, transactions, and processes. The OCR engines 250 and the client keying application 251 may be a suite of applications for conducting OCR.

The applications 220, 221, 250, 251, and 270 are for instructing the processing devices 214, 244 and 264 to perform various steps of the methods discussed herein, and/or other steps and/or similar steps. In various embodiments, one or more of the applications 220, 221, 250, 251, and 270 are included in the computer readable instructions stored in a memory device of one or more systems or devices other than the systems 260 and 240 and the resource document digitization system 211. For example, in some embodiments, the application 220 is stored and configured for being accessed by a processing device of one or more third party systems connected to the network 230. In various embodiments, the applications 220, 221, 250, 251, and 270 stored and executed by different systems/devices are different. In some embodiments, the applications 220, 221, 250, 251, and 270 stored and executed by different systems may be similar and may be configured to communicate with one another, and in some embodiments, the applications 220, 221, 250, 251, and 270 may be considered to be working together as a singular application despite being stored and executed on different systems.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the issuer devices 296 and/or any other system or component used in conjunction with or to perform any of the method steps discussed herein. For example, the financial institution system 240 may include a financial institution system, a credit agency system, and the like.

In various embodiments, the financial institution system 240, the third party system 260, and the resource document digitization system 211 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more methods discussed below, or other methods, processes or steps discussed herein or not discussed herein.

Figure 2:
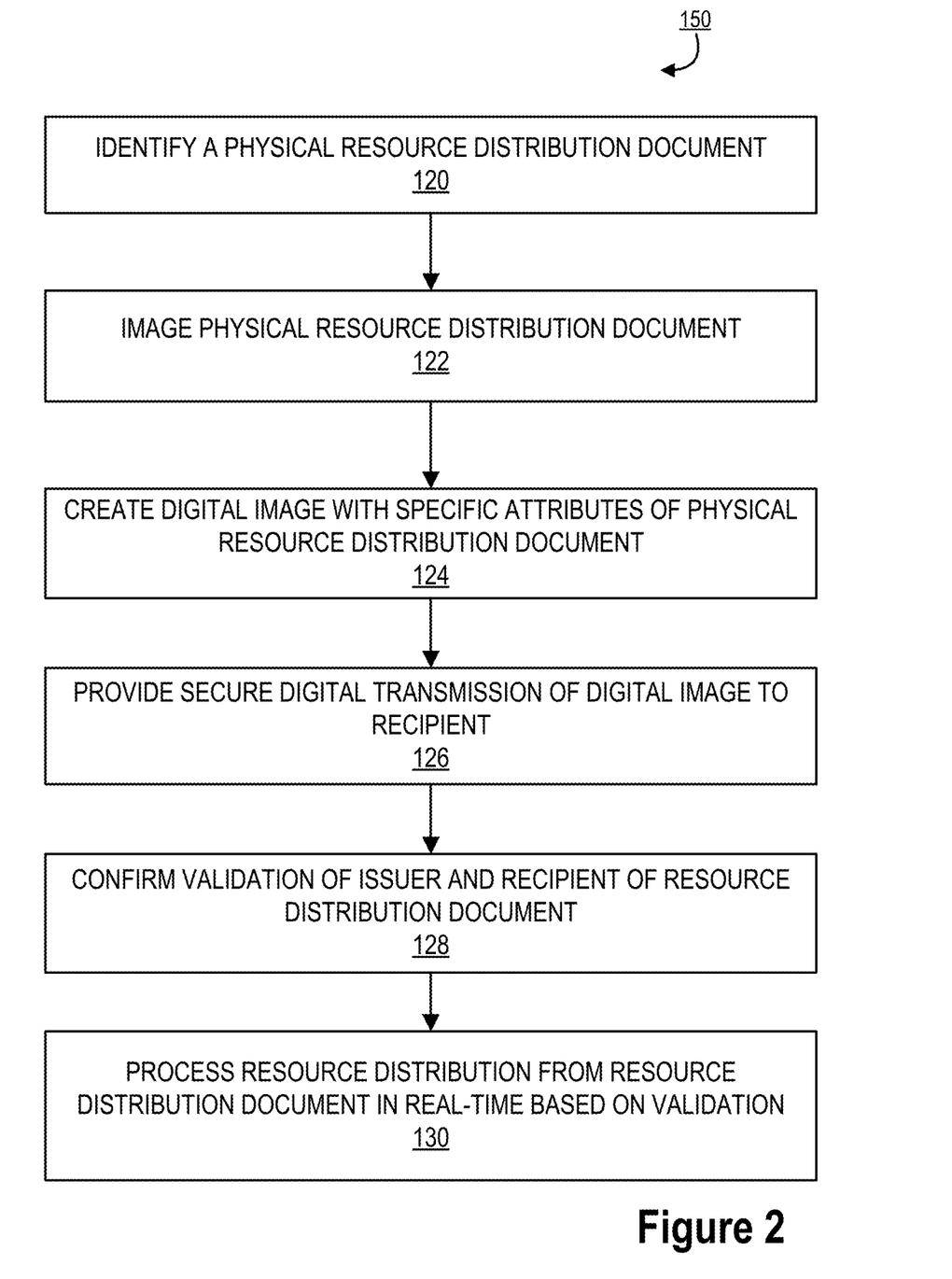
FIG. 2 provides a high level process flow illustrating resource document digitization, in accordance with one embodiment of the present invention.

FIG. 2 provides a high level process flow illustrating resource document digitization 150, in accordance with one embodiment of the present invention. As illustrated in block 120, the process 150 is initiated by identifying a physical resource distribution document. The physical resource distribution document may be drafted by an issuer to provide a resource distribution from the issuer to a recipient. The physical resource document may be a check or the like. The system may identify the physical resource distribution document drafted by the issuer. The system may identify the physical resource distribution document based on the issuer presenting the document via a camera, scanner, or the like for digitalizing the document. As illustrated in block 122, the process 150 continues by imaging the physical resource distribution document. In some embodiments, the image of the resource distribution document may be taken by an issuer device, scanning device, a specialized apparatus associated with the financial institution (e.g. a computer system) via a communicable link to a user's mobile device, a camera, an Automated Teller Machine (ATM) at one of the entity's facilities, or the like. In other embodiments, the apparatus may be configured with a camera to capture the image of the resource distribution document for processing.

Next, as illustrated in block 124, the process 150 continues by creating a digital image with specific attributes of the physical resource distribution document. In this way, the system identified segments of the physical resource distribution document that make it a resource distribution document. As such, the system may perform initial processing of the resource distribution document. In this way, the system may receive the resource distribution document, confirm authenticity, and then lift indicia in the form of data off of the resource distribution document using scanning, photographing, or optical character recognition (OCR). The processes enables the system to convert text and other symbols in the resource distribution document images to other formats such as text files and/or metadata, which can then be used and incorporated into a variety of applications, documents, and processes. In some embodiments, algorithms used in the processes incorporate pattern matching techniques to confirm authenticity of the resource distribution document. For example, each character in an imaged word, phrase, code, or string of alphanumeric text can be evaluated on a pixel-by-pixel basis and matched to a stored character. Various algorithms may be repeatedly applied to determine the best match between the image and stored characters.

Furthermore the resource distribution document may be divided into segments. Each segment may contain an attribute, such as date, pay to the order of, check number, security icon, amount, and the like.

The system defines location fields of the resource distribution document segments by separating the elements of the image of the resource distribution document into segments. As referred to herein, the term segment is used broadly to describe the process of differentiating elements of a resource distribution document image by separating portions and/or elements of the image of the resource distribution document into sectors in order to define the location fields. These sectors may be identified using a two-dimensional coordinate system or any other system that can be used for determining the location of the sectors. In many instances, each sector will be rectangular in shape. In some embodiments, the system identifies each portion of the image of the resource distribution document using a plurality of segments. In such an embodiment, the system may further analyze each segment using algorithms in order to determine whether each segment has valuable or useful information and the overall authentication of the resource distribution document.

Next, as illustrated in block 126, the process 150 continues by providing a secure digital transmission of the digital image to the recipient. This may be transmitted from the issuer device to the recipient device via a network. As such, the system generates a digital version of the physical resource distribution document and transmits the digital resource distribution document to the designated recipient of the resource distribution document. The transmission may identify the recipient by location, phone number, email address, or the like.

Furthermore, the specific attributes identified in block 124 may be transmitted to an appropriate financial institution associated with the recipient or the system for financial institution confirmation of authentication of the resource distribution document.

As illustrated in block 128, along with the entity associated with the system and/or a financial institution associated with the issuer or recipient, both the user and the recipient may confirm the resource distribution document validity. In this way, the issuer may confirm via the issuer device that the issuer drafted the resource distribution document and that it is authentic and received by the appropriate recipient. The recipient may validate via the recipient device that the resource distribution document is for a correct amount and from the correct issuer. The entity associated with the system and/or a financial institution may confirm the authentication and validity of the resource distribution document.

Finally, as illustrated in block 130, the process 150 is completed by processing the resource distribution from the resource distribution document in real-time based on the validation of the resource distribution document. Based on the validation processing, the system may treat this as a person-to-person or real-time payment and not process the resource distribution document via check processing channels. As such, providing a real-time payment posting method for check depositing.

Figure 3:
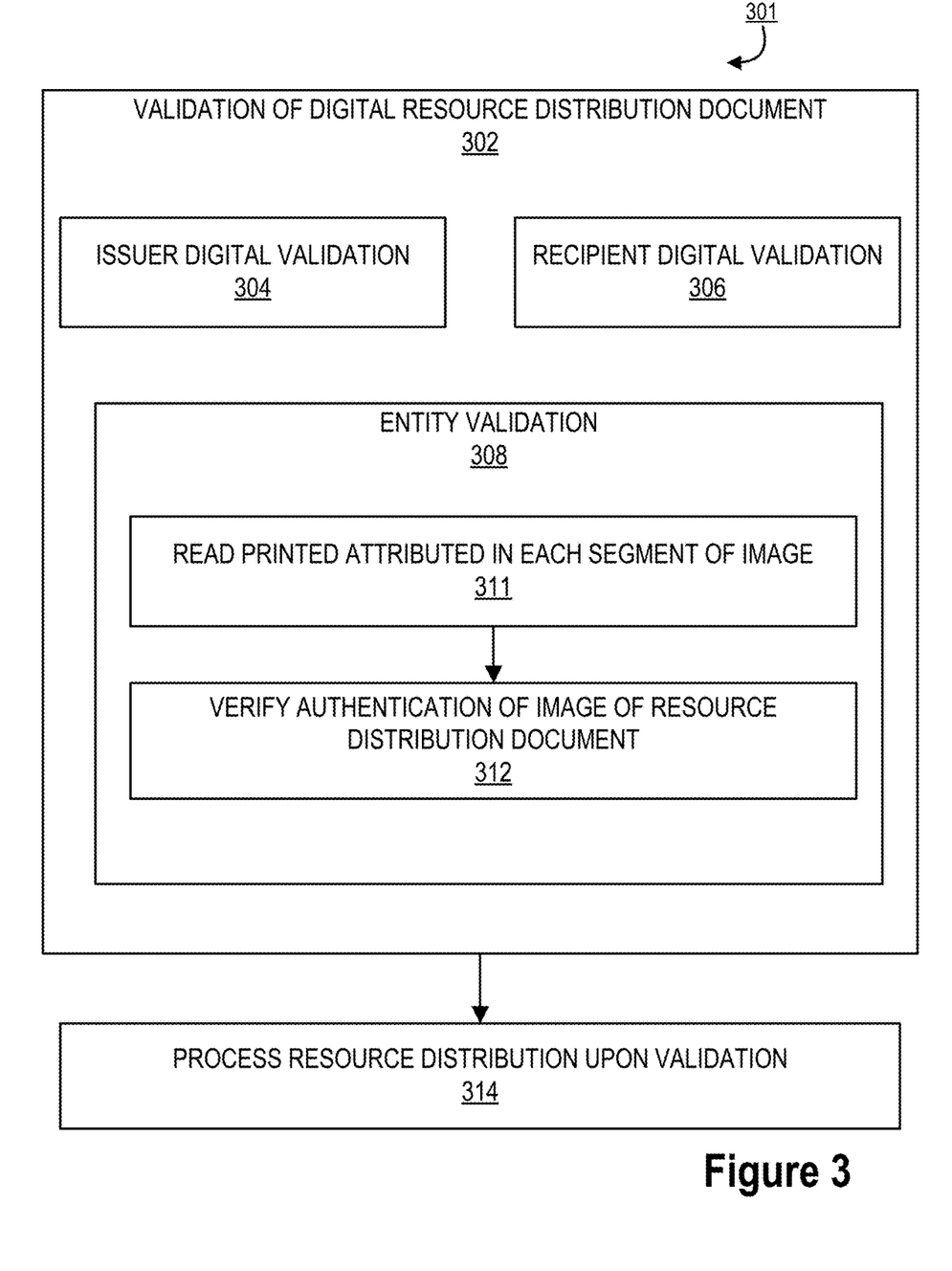
FIG. 3 provides a high level process flow illustrating validation of a digitized resource distribution document, in accordance with one embodiment of the present invention.

FIG. 3 provides a high level process flow illustrating validation of a digitized resource distribution document 301, in accordance with one embodiment of the present invention. As illustrated in block 302, the FIG. 3 provides a validation of the digital resource distribution document. There are three parts to the validation process including issuer digital validation 304, recipient digital validation 306, and entity validation 308. In some embodiments all validations are required. In some embodiments, only a single validation is required. In some embodiments the validation is performed at the beginning of the process. In some embodiments, the validation is performed during the process. In some embodiments, the validation is performed at the end of the process.

Issuer validation 304 requires the issuer to validate upon digital transmission of the digital resource distribution document, the amount associated with the resource distribution document, the recipient of the resource distribution document, and an authorization to distribute the amount associated with the resource distribution document to the recipient. Furthermore, the issuer must provide an address for the recipient. This address may be an alias, account number, email address, phone number, or the like address that is capable of receiving a digital message with the resource distribution document.

Recipient digital validation 306 requires that the recipient accept the resource distribution document, authenticate that he/she is the intended recipient, and validate the amount of the distribution. With this information, the recipient may proceed with depositing the amount associated with the resource distribution document into his/her account.

Finally, as illustrated in block 308, an entity provides validation of the digital resource distribution document. The entity may be a financial institution associated with the issuer, recipient, and/or the system. The financial institution may review the resource distribution document to confirm authentication of the document, resources available for the document transfer, and the like. In some embodiments, the entity validation may occur during the transmission of the digital resource distribution document from the issuer to the recipient. In some embodiments, this may be performed by the issuer's financial institution. The entity validation 308 may further comprise the entity reading the printed attributes in each segment of the digital image, as illustrated in block 311. The attributes may be one or more portions of a check. These may include address, check number, date, pay to the order of, signature, memo, bank information, MICR line, or the like. Along with dividing the resource distribution document into segments, system may also read the printed attributes within each of those section. In this way, the system identifies the resource distribution document attributes and their actual position relative to each other. Identifying the actual position of the attributes relative to each other may be performed by the program read of the printed attributes.

As illustrated in block 312 the entity may verify the authentication of the image of the resource distribution document. This may be done by comparing the location of the attributes within each of the segments to ANSI standards. The ANSI standards are specific locations each attribute is supposed to be within a resource distribution document. As such, each attribute should be located within a specific location on an instrument to be considered an authentic instrument. Furthermore, the entity may verify symmetry in locations based on relevant positioning of the attributes compared to the standards. Furthermore, upon comparison entity may allow for processing of the resource distribution document as symmetrical or flag the resource distribution document as an attribute anomaly and as being a potentially misappropriated instrument.

As illustrated in block 512, the process 500 continues by processing the resource distribution upon issuer digital validation 304, recipient digital validation 306, and entity validation 308.

Figure 4:
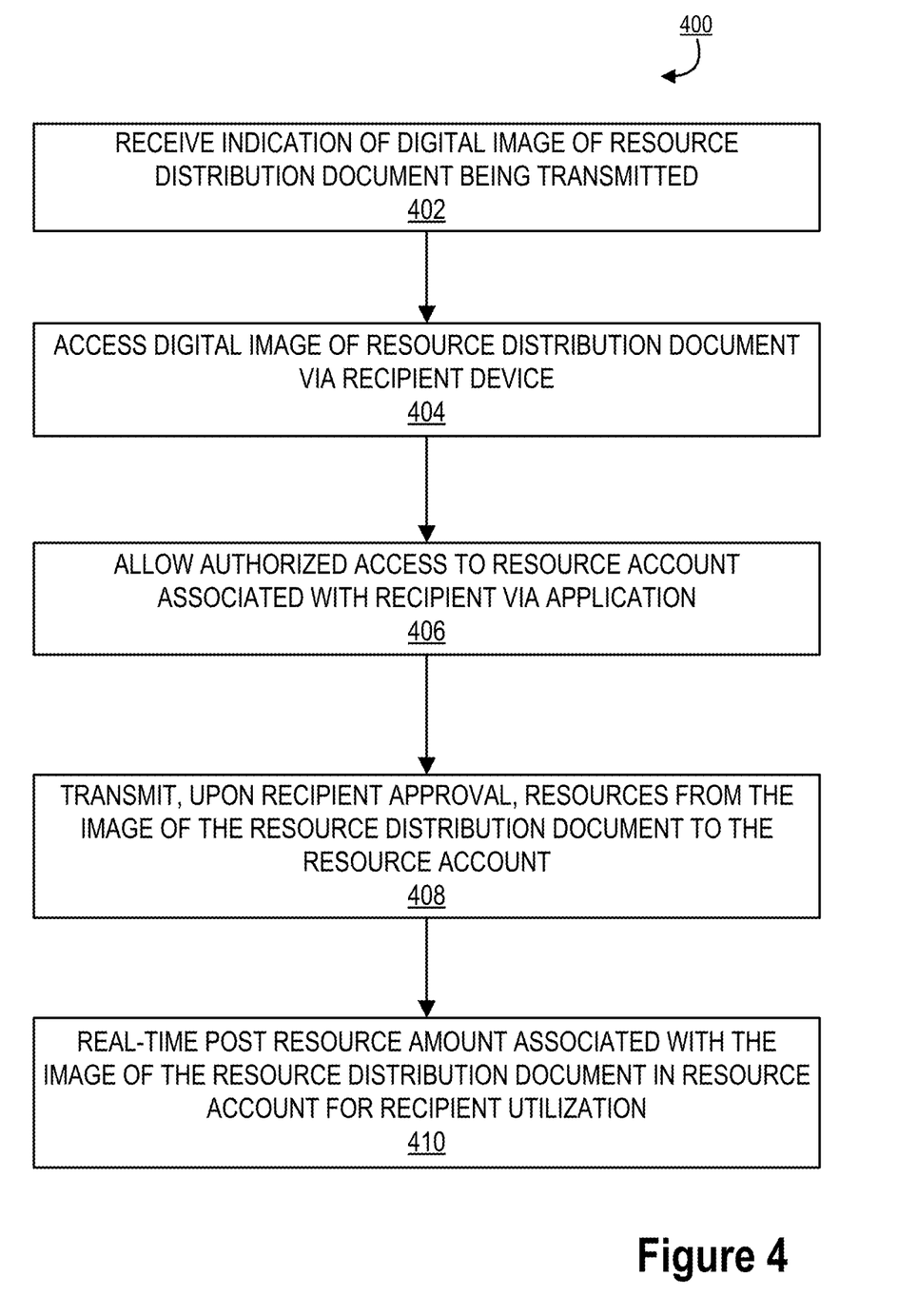
FIG. 4 provides a high level process flow illustrating receiving and posting a digitized resource distribution document, in accordance with one embodiment of the present invention.

FIG. 4 provides a high level process flow illustrating receiving and posting a digitized resource distribution document 400, in accordance with one embodiment of the present invention. As illustrated in block 402, the process 400 is initiated by the recipient receiving an indication that a digital image of a resource distribution document is being transmitted to the recipient. This indication may be received electronically via email, notification, text, or the like.

The process 400 continues by allowing the recipient access to the digital image of the resource distribution document via the recipient device, as illustrated in block 402. The digital image of the resource distribution document may be accessed via the recipient's device using any image display software.

Once the recipient identifies the resource distribution document and views the digital resource distribution document, the recipient may be able to validate the document and validate that he/she is the correct recipient of the resource distribution document.

Next, as illustrated in block 406, the process 400 continues by allowing for authorized access to a resource account associated with the recipient via an application. This may be a financial institution application or the like of the recipient that requires recipient authentication and authorization to gain access. The system, upon access of the resource application may transmit, upon validation, the resource image to the recipient for visualization within the resource application.

As illustrated in block 408, once the image of the resource distribution document is accessible within the resource application, the system may transmit, upon validation, the resources from the image of the resource distribution document to the resource account selected by the recipient within the resource application. As such, the system may display, on the financial institution application or resource application, the image of the resource distribution document and allow for recipient selection of an account on the application to apply the resources from the resource distribution document to. As such, the recipient may be able to directly deposit the resources from the digital resource distribution document to an account accessible on the application.

Finally, as illustrated in block 410, the process 400 is completed by providing a real-time posting of the resource amount associated with the image of the resource distribution document in the resource account selected by the recipient. Thus allowing the recipient to immediately have access to and utilize the resources from the resource distribution document.

Figure 5A:
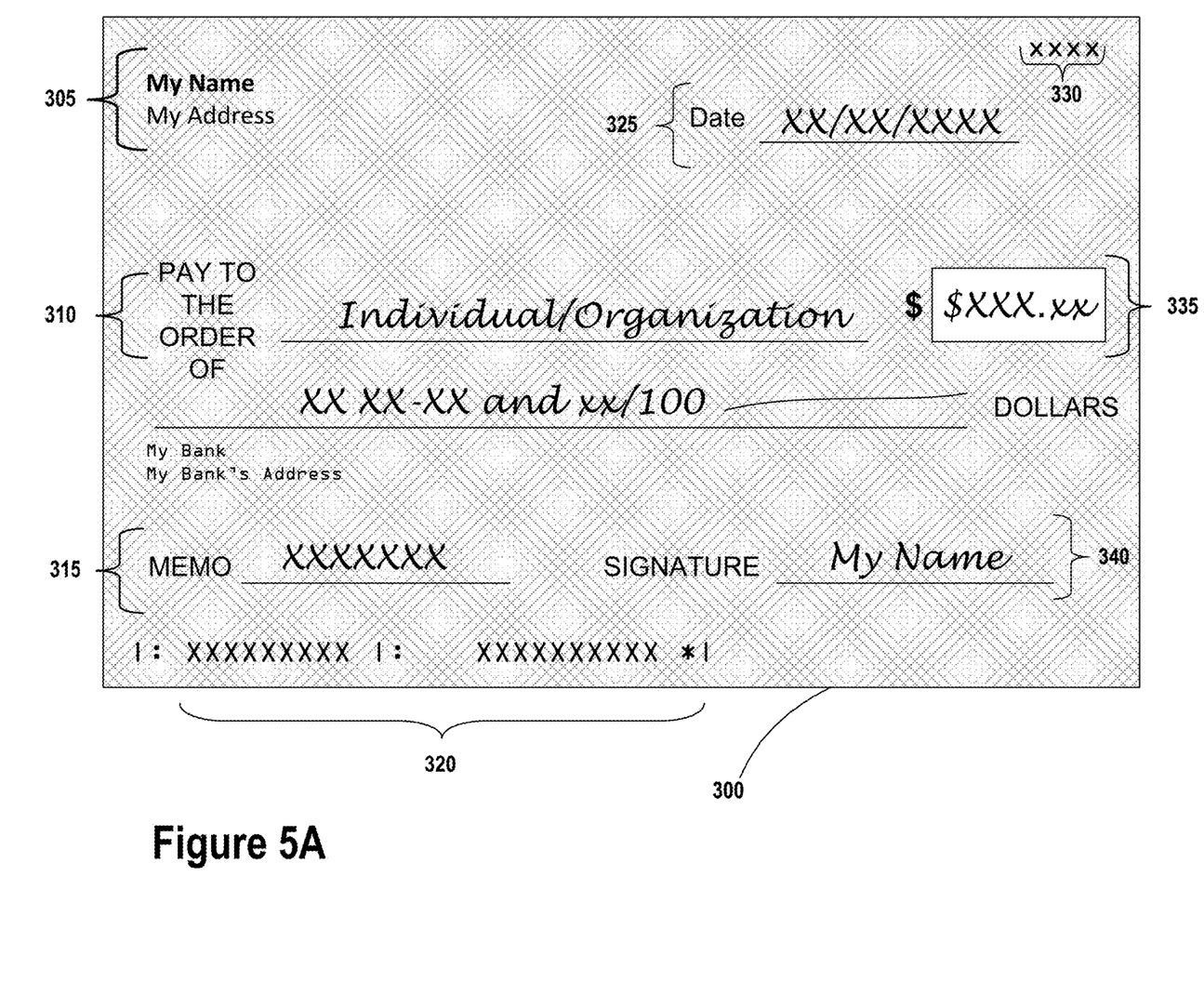
FIG. 5A illustrates an exemplary image of a resource distribution document, in accordance with one embodiment of the present invention.

FIG. 5A provides an illustration of an exemplary image of a resource distribution document 300, in accordance with one embodiment of the present invention. The resource distribution document illustrated in FIG. 5A is a check. However, one will appreciate that any financial record, financial document, payment instrument, or the like may be provided.

The image of resource distribution document 300 may comprise an image of the entire resource distribution document, a thumbnail version of the image of the resource distribution document, individual pieces of resource distribution document information, all or some portion of the front of the resource distribution document, all or some portion of the back of the resource distribution document, or the like. Resource distribution document 300 comprises resource distribution document information, wherein the resource distribution document information comprises contact information 305, the payee 310 or recipient, the memo description 315, the account number and routing number 320 associated with the appropriate user or customer account, the date 325, the resource distribution document number 330, the amount of the resource distribution document 335, the signature 340, or the like. In some embodiments, the resource distribution document information may comprise text. In other embodiments, the resource distribution document information may comprise an image. A capture device may capture an image of the resource distribution document 300 and transmit the image to a system of a financial institution via a network. The system may collect the resource distribution document information from the image of the resource distribution document 300 and store the resource distribution document information in a datastore as metadata. In some embodiments, the pieces of resource distribution document information may be securely transmitted digitally to the recipient.

Figure 5B:
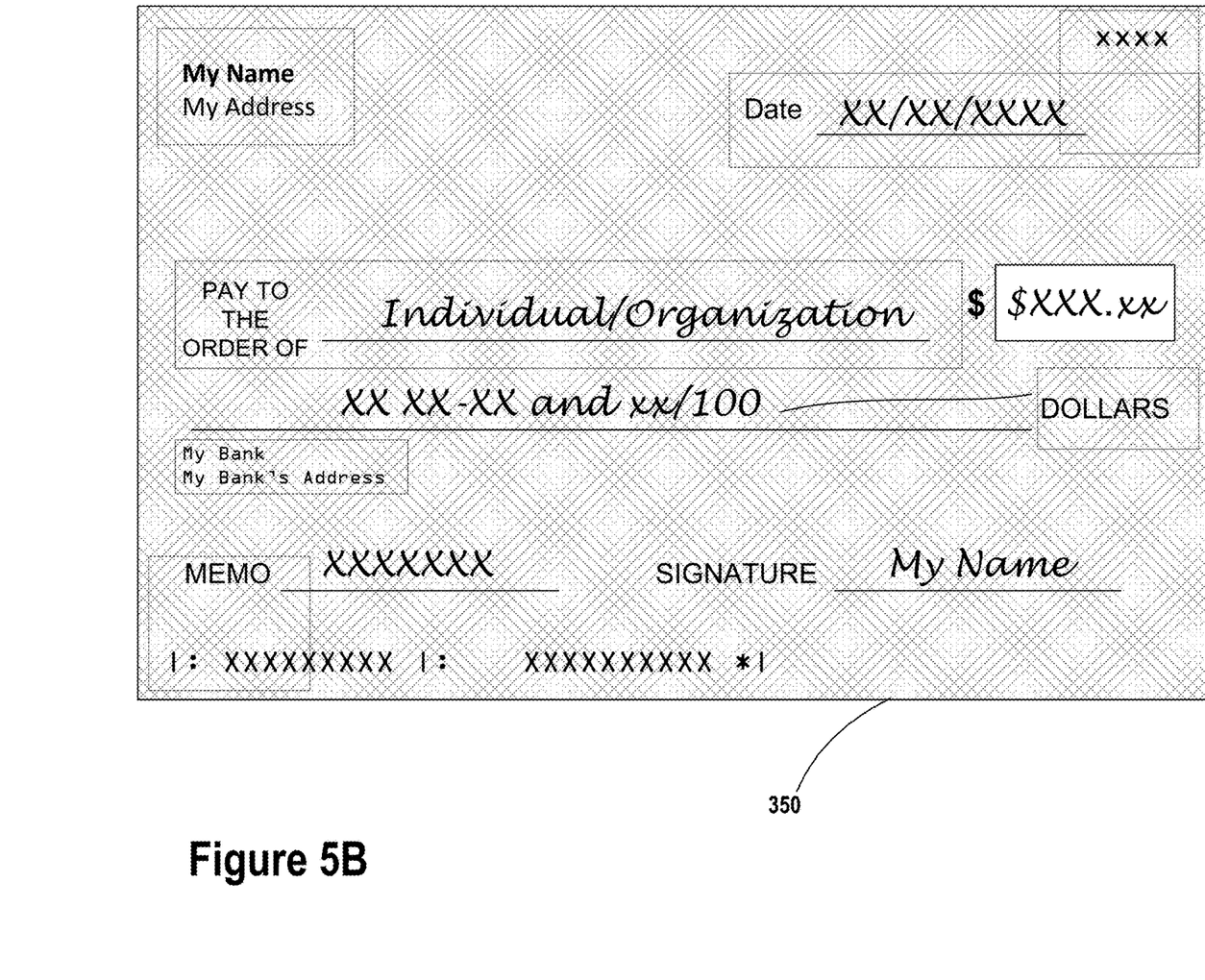
FIG. 5B illustrates an exemplary image of a processed resource distribution document, in accordance with one embodiment of the present invention.

FIG. 5B provides an illustration of an exemplary image of a processed resource distribution document 350, in accordance with one embodiment of the present invention. The resource distribution document illustrated in FIG. 5B is a check. However, one will appreciate that any financial record, financial document, payment instrument, or the like may be provided.

The image of resource distribution document illustrated in FIG. 5B includes the processing from an image read program identifying the attributes. Each attribute is identified and a box is presented highlighting the attribute. These attributes may comprise contact information, the payee, the memo description, the account number, routing number associated with the appropriate user or customer account, the date, the resource distribution document number, the amount of the resource distribution document, the signature, or the like.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for digitization and real-time processing of a physical resource document, the system comprising:
    a memory device with computer-readable program code stored thereon;
    a communication device;
    a processing device operatively coupled to the memory device and the communication device, wherein the processing device is configured to execute the computer-readable program code to:
        integrate into an image capture device and extract a digital resource distribution document from an image capture of the physical resource distribution document, wherein the physical resource distribution document is drafted by an issuer to distribute resources to a recipient;
        identify and divide segments of the digital resource distribution document, wherein the segments are divided by attributes on the physical resource distribution document;
        transmit, via a secure electronic communication channel, the digital resource distribution document to the recipient;
        reconstruct the digital resource distribution document and display the reconstructed digital resource distribution document on an interface associated with a recipient device, wherein the reconstructed digital resource distribution document displayed illustrates the physical resource distribution document drafted by the issuer;
        perform validation requests from the issuer, the recipient, and an entity;
        integrate the digital resource distribution document into the recipient resource application; and
        process and post, in real-time, resources from the physical resource distribution document to an account associate the recipient via the recipient resource application.

2. The system of claim 1, wherein processing and posting, in real-time, resources from the physical resource distribution document to an account associate the recipient via the recipient resource application further comprises validation from the issuer, the recipient, and the entity.

3. The system of claim 1, wherein processing and posting is performed via real-time payment or person-to-person payment channels and not check processing channels.

4. The system of claim 1, wherein the validation request performed by the issuer confirms from the issuer an appropriate amount of resource distribution, authentication of the physical resource distribution document, and an appropriate recipient.

5. The system of claim 1, wherein the validation request performed by the recipient confirms from the recipient an appropriate amount of resource distribution, authentication of receipt of the resource distribution document, and an appropriate issuer.

6. The system of claim 1, wherein the validation request performed by the entity comprises performing a comparison analysis via machine learning application processing, wherein the comparison analysis compares a symmetry of attributes associated with the digital resource distribution document to a resource distribution instrument standard and flagging of digital resource distribution documents comprising a symmetrical anomaly.

7. The system of claim 1, wherein transmitting, via a secure electronic communication channel, the digital resource distribution document to the recipient is further performed via digital transmission to an address associated with the recipient, wherein the address is a digital identifier of the recipient.

8. The system of claim 1, wherein the resource distribution document comprises a check for a transfer of resources from the issuer to the recipient.

9. A computer program product for digitization and real-time processing of a physical resource document, the computer program product comprising at least one non-transitory computer-readable medium having computer-readable program code portions embodied therein, the computer-readable program code portions comprising:
    an executable portion configured for integrating into an image capture device and extract a digital resource distribution document from an image capture of the physical resource distribution document, wherein the physical resource distribution document is drafted by an issuer to distribute resources to a recipient;
    an executable portion configured for identifying and dividing segments of the digital resource distribution document, wherein the segments are divided by attributes on the physical resource distribution document;
    an executable portion configured for transmitting, via a secure electronic communication channel, the digital resource distribution document to the recipient;
    an executable portion configured for reconstructing the digital resource distribution document and display the reconstructed digital resource distribution document on an interface associated with a recipient device, wherein the reconstructed digital resource distribution document displayed illustrates the physical resource distribution document drafted by the issuer;
    an executable portion configured for performing validation requests from the issuer, the recipient, and an entity;
    an executable portion configured for integrating the digital resource distribution document into the recipient resource application; and
    an executable portion configured for processing and posting, in real-time, resources from the physical resource distribution document to an account associate the recipient via the recipient resource application.

10. The computer program product of claim 9, wherein processing and posting, in real-time, resources from the physical resource distribution document to an account associate the recipient via the recipient resource application further comprises validation from the issuer, the recipient, and the entity.

11. The computer program product of claim 9, wherein processing and posting is performed via real-time payment or person-to-person payment channels and not check processing channels.

12. The computer program product of claim 9, wherein the validation request performed by the issuer confirms from the issuer an appropriate amount of resource distribution, authentication of the physical resource distribution document, and an appropriate recipient.

13. The computer program product of claim 9, wherein the validation request performed by the recipient confirms from the recipient an appropriate amount of resource distribution, authentication of receipt of the resource distribution document, and an appropriate issuer.

14. The computer program product of claim 9, wherein the validation request performed by the entity comprises performing a comparison analysis via machine learning application processing, wherein the comparison analysis compares a symmetry of attributes associated with the digital resource distribution document to a resource distribution instrument standard and flagging of digital resource distribution documents comprising a symmetrical anomaly.

15. The computer program product of claim 9, wherein transmitting, via a secure electronic communication channel, the digital resource distribution document to the recipient is further performed via digital transmission to an address associated with the recipient, wherein the address is a digital identifier of the recipient.

16. The computer program product of claim 9, wherein the resource distribution document comprises a check for a transfer of resources from the issuer to the recipient.

17. A computer-implemented method for digitization and real-time processing of a physical resource document, the method comprising:
    providing a computing system comprising a computer processing device and a non-transitory computer readable medium, where the computer readable medium comprises configured computer program instruction code, such that when said instruction code is operated by said computer processing device, said computer processing device performs the following operations:
    integrating into an image capture device and extract a digital resource distribution document from an image capture of the physical resource distribution document, wherein the physical resource distribution document is drafted by an issuer to distribute resources to a recipient;
    identifying and dividing segments of the digital resource distribution document, wherein the segments are divided by attributes on the physical resource distribution document;
    transmitting, via a secure electronic communication channel, the digital resource distribution document to the recipient;
    reconstructing the digital resource distribution document and display the reconstructed digital resource distribution document on an interface associated with a recipient device, wherein the reconstructed digital resource distribution document displayed illustrates the physical resource distribution document drafted by the issuer;

performing validation requests from the issuer, the recipient, and an entity;

integrating the digital resource distribution document into the recipient resource application; and processing and posting, in real-time, resources from the physical resource distribution document to an account associate the recipient via the recipient resource application.

18. The computer-implemented method of claim 17, wherein processing and posting, in real-time, resources from the physical resource distribution document to an account associate the recipient via the recipient resource application further comprises validation from the issuer, the recipient, and the entity.

19. The computer-implemented method of claim 17, wherein processing and posting is performed via real-time payment or person-to-person payment channels and not check processing channels.

20. The computer-implemented method of claim 17, wherein the validation request performed by the entity comprises performing a comparison analysis via machine learning application processing, wherein the comparison analysis compares a symmetry of attributes associated with the digital resource distribution document to a resource distribution instrument standard and flagging of digital resource distribution documents comprising a symmetrical anomaly.

* * * * *